March 24, 1931.  J. M. MULLEN  1,797,294
SHIPPING AUTOMOBILES
Filed Sept. 7, 1929   2 Sheets-Sheet 1
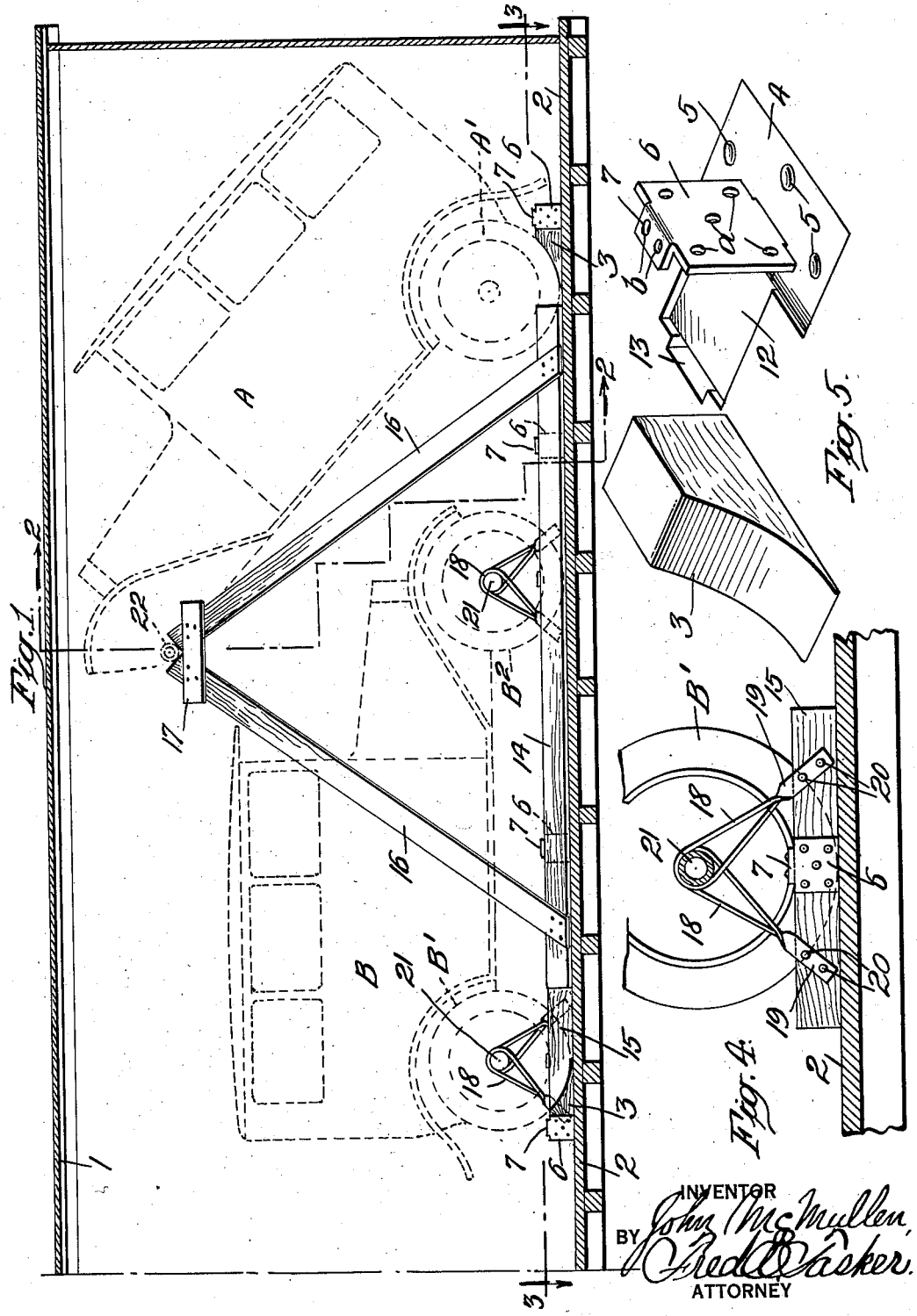

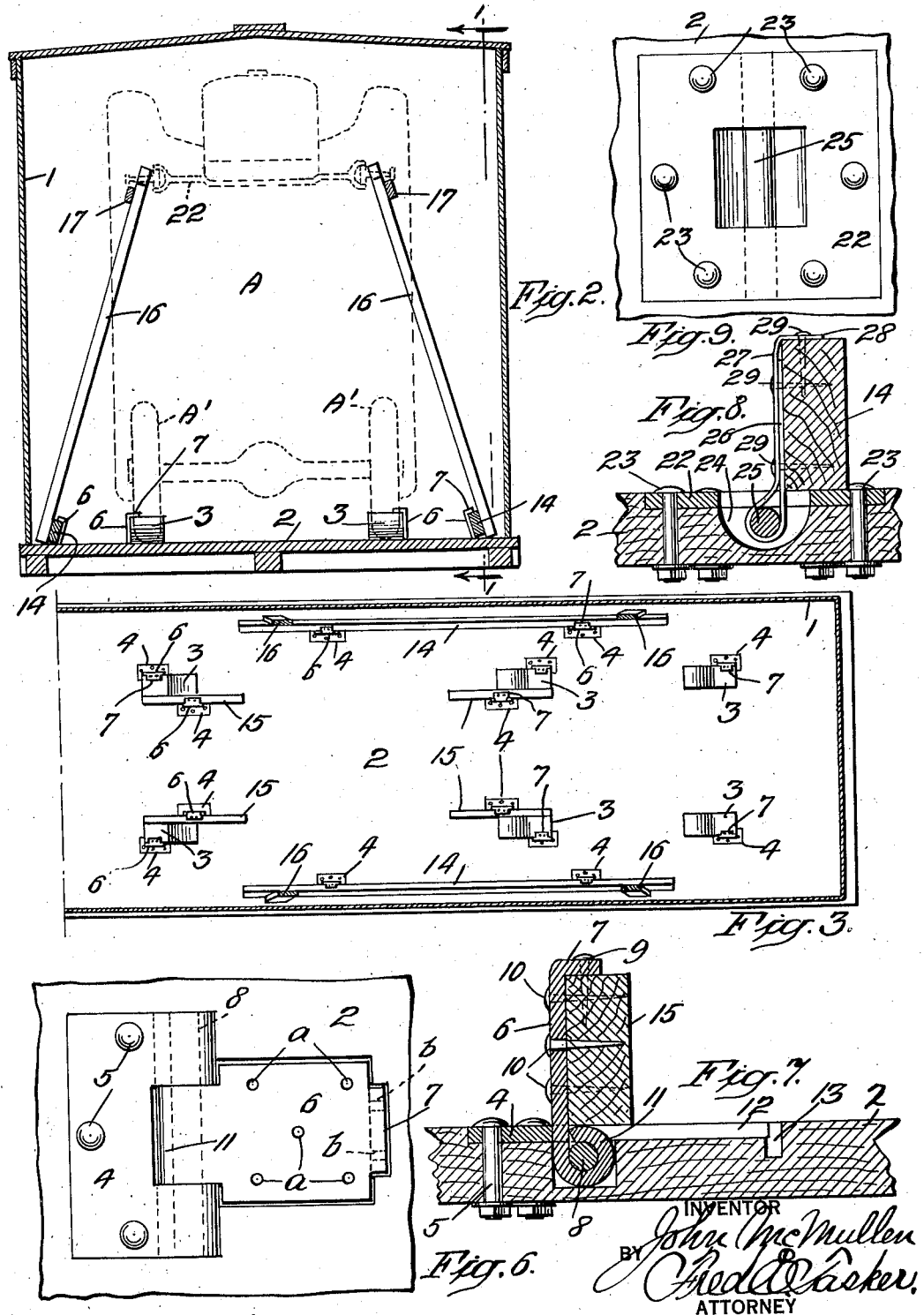

Patented Mar. 24, 1931

1,797,294

UNITED STATES PATENT OFFICE

JOHN McMULLEN, OF BUFFALO, NEW YORK, ASSIGNOR OF ONE-FIFTH TO ARTHUR J. McMULLEN, ONE-FIFTH TO VINCENT J. McMULLEN, ONE-FIFTH TO HELEN L. AILINGER, ALL OF BUFFALO, NEW YORK, AND ONE-FIFTH TO JOHN F. McMULLEN, OF KENMORE, NEW YORK

SHIPPING AUTOMOBILES

Application filed September 7, 1929. Serial No. 390,942.

Automobiles and similar wheeled vehicles when shipped from the factory to the distributor or user are in most cases fully assembled, and are properly positioned within a freight or other car, preferably of the box type, according to some prearranged plan of loading, of which there are many kinds.

In one well known method of shipment, owing to the length of the automobiles, the shipping cars therefor are capable of carrying only about four arranged in a single row. Of these four, two automobiles are placed one in each end of the car with one end of the automobile adjacent to the end of the car and with the center line of the automobile aligned with the longitudinal center line of the car, and these two are mounted in inclined or half decked positions with their rear ends at opposite ends of the car; while the other two automobiles are placed end to end on all their four wheels between and with their hoods extending under the half deck automobiles. I mention this as one method; there are of course many other ways.

My present invention therefore relates to the shipping of automobiles in freight cars of any kind, either flat cars, gondola cars, or box cars, but preferably the latter; and has for one object the provision of a simple, economical and novel means whereby automobiles may be securely fastened in the car and removed therefrom with relative ease and speed, and without any damage to the car construction, which can therefore be made to serve for many years without the replacement of parts, and, not being specially and exclusively built for automobiles can whenever desired be used for other shipping functions as well.

Heretofore in the shipment of automobiles in railway box cars it has been customary to employ mechanisms often elaborate and costly for supporting the automobiles during shipments in such a manner that they are firmly held and prevented from movement either longitudinally or laterally with respect to the car; but such mechanisms usually involve the bolting, spiking, or nailing of various angle irons or other holding devices to the floors or sides of the car, all of which nailed parts have to be torn away or dislodged when the automobile is released and removed from the car for delivery, resulting in excessive damage to the car, and causing great expense in the way of repairs to a car after a few trips, through the substitution of new floors and sides and the practical rebuilding of many parts of a car virtually destroyed by this rough treatment. Also, very often the jolting and straining of the railway car in running works these parts loose.

My great aim is to avoid injury to the box car itself in making these shipments, and I accomplish this by permanently applying certain engaging or planting devices to the floor and other parts of the car, which may cooperate with temporary braces, rails, blocks, chocks, and straps, or other dunnage, or the like, used around and with the loaded automobile, which clamping devices remain permanently built in as a part of the car body but capable of being concealed when the car is being used for other purposes than transporting automobiles, and capable of being readily manipulated from an active to an idle position and reverse as and whenever desired, and when combined with the temporary forms making a more secure anchoring means for the automobiles; the paramount purpose being to save injuries to the car construction and consequent repair costs.

With the above-mentioned and other objects in view, my invention may be said to consist in the novel construction, combination and arrangement of parts hereinafter described, illustrated in the accompanying drawings and pointed out in the claims hereto appended; it being understood that various changes in the form, proportion, size, material, and minor details of construction within the scope of the claims may be resorted to without departing from the spirit or sacrificing any of the advantages of the invention.

To more fully comprehend the invention, reference is directed to the accompanying drawings, in which—

Figure 1 is a longitudinal section on the line 1, 1, of Figure 2 through half of the interior of a freight car illustrating my improved means for supporting automobiles without damaging the car floor or structure. The positions assumed by two automobiles are shown in dotted lines. The lading of the other half of the car that is not shown will be symmetrical with that of the half shown.

Figure 2 is a transverse section on the line 2, 2, of Figure 1.

Figure 3 is a plan view of the car floor equipped with my improved clamping devices, the side walls of the car being in section on the line 3, 3, of Figure 1.

Figure 4 is a detail view showing a fragment of the car floor and of one of the rear wheels of the automobile at the left hand in Figure 1, and showing also the arrangement of the hold-down straps for the left axle carrying said wheel and my improved clamping means for holding said straps on the floor.

Figure 5 is a perspective view of one of the chock blocks used with the wheels, and of one of the floor clamps used to hold it firmly, as also to hold other similar members of the anchoring frames for the automobiles.

Figure 6 is a detail plan view of a fragment of the car floor and one of the hinged clamping devices set in the floor flush with the surface thereof, when said clamp is closed down flush to occupy its inactive position.

Figure 7 is a sectional view of the same when the clamping leg or arm is raised from its idle into its effective position, and shows it securely spiked to a beam or member belonging to the automobile packing frame.

Figure 8 is a sectional view of an alternative kind of hinged clamping means applied securely to a frame member.

Figure 9 is a fragmentary view of the floor with a modified form of clamping plate bolted thereto.

Like characters of reference denote like parts throughout all the different figures of the drawing.

In the one form of loading which I have illustrated for explanatory purposes only and with no intention of being confined thereto, two automobiles shown in outline in dotted lines at A and B are placed in the one half 1 of the car, the other half which is not shown being similarly filled with two more automobiles. The automobile A is in the end of the car with its rear end adjacent to the end of the car. Each rear wheel $A^1$ is held by a chock block 3. The automobile A is mounted in an inclined or half deck position and held there by means of a frame that I will shortly explain.

The automobile B is placed with its wheels $B^1$ and $B^2$ on the floor and with its hood under the half decked automobile A and its wheels held by chock blocks, and the car anchored by hold-down straps or similar means. Considering the other half of the car to have two more similarly placed automobiles, it will be understood that the entire box car contains two inclined automobiles with their rear ends at opposite ends of the car and two other automobiles placed rear to rear on all their wheels and with their hoods under the half decked automobiles. This style of lading four automobiles in a car was referred to by me at the outset, but obviously the lading of the automobiles may be arranged relatively to each other in various ways, and the selection of a loading method may depend somewhat on the size and type of the automobile.

When the front of an automobile, as A, is raised to occupy a half decked position, it is essential to have a strong frame or horse to hold it up. One kind that can be used comprises two doubly-inclined rails 16, 16, located in pairs on each side of the car, the same being inclined toward each other in an inverted V-shape, the upper ends being joined by a short horizontal strut 17 and providing at their top meeting point an angle that receives and holds the axle spindle at one end of the front axle 22. These rails 16 are also splayed outwardly from their top ends to the sides of the car 1 at the bottom.

With such an arrangement the lower ends of the rails or legs 16 of these supporting frames are quite closely adjacent to the side walls of the car. At this point the lower ends of rails or legs 16 are nailed or otherwise securely fastened to the longitudinal beams, planks or strips 14 on the floor of the car, see Figures 1 and 2. Thus there are two of these inverted V-frames mounted in the doubly-inclined position on the horizontal base members 14 which are fastened to the car floor by my improved clamping means as I shall presently explain.

Chock blocks 3 are used with the rear wheels $A^1$ of the inclined car A, and with all the wheels $B^1$ and $B^2$ (or only a part of them) of the horizontal car B. All these chocks 3 are of the common and well known form with an arcuate section that corresponds to and receives against it a segment of the wheel tire. The chocks are all secured to the car floor as I shall presently specify.

Also the car B besides having its four wheels (or a part of them) chocked, has the axles 21 or some other adjacent parts held in place by hold-down straps 18, 18, two with each end of the axle which are looped over the top of the axles 21 and with their lower ends 19 secured by nails 20 of bolts to short blocks or bars 15 that lie on the car floor 2 contiguous to the chocks 3, see Figure 3; and these bars or members 15 are secured to the car floor by my improved means, as I shall specify.

At various points in the floor 2 I provide or form recesses as shown at 12 in Figures 5 and 7. Each of these recesses is shaped and configured to accommodate therein a plate 4, to which is pivoted or otherwise movedly connected a clamping hook or plate 6, having a right angled lip, flange, or shoulder 7 on its outer end. The plate 4 is set in floor 2 flush with the upper surface thereof, and is permanently secured strongly thereto by means of bolts 5. The plate 4 is formed with an integral pivot pin 8 set in a deeper part of the floor recess, and around pin 8 one end 11 of clamp 6 is bent in tubular form, so that pin 8 and tube 11 constitute a pivot on which the clamping member 6 may be turned up or down and caused to occupy the idle position shown in Figure 6 where it is flush with the floor, or raised to occupy its active position, vertical or inclined above floor 2 where its lip or flange 7 hooks over a block or beam, as 14 or 15, or any other part of the holding means for the automobiles, to engage the same and anchor it firmly. The clamp 6 has a plurality of holes *a* therein, through which nails or spikes 10 may be driven into said block or other part as 15, and the flange 7 has a number of holes *b* for similar spikes 9 that also enter block 15. When the clamp 6 is in its horizontal flush position, as in Figure 6, its lip 7 occupies a deeper part of the floor recess at 13. When the clamp is raised and fastened by nails to a beam or other part, said beam or block is held immovably until the part is released from the clamp.

Thus these clamps engage the chocks 3, the blocks 15 and the long rails 14, to hold these parts very closely and thus prevent the automobiles from jarring or vibrating unduly. The floor plan in Figure 3 shows a large number of these clamps effectively employed for the object mentioned with various members belonging to the automobile supporting means.

A modified form of clamp is shown in Figures 8 and 9. Here the plate 22 set into the floor 2 is provided with an opening above a curved and rather deep recess 24 in the floor, in which recess is a pin 25 that is integral with plate 22 and serves as a pivot. Plate 22 is secured flush in the floor by a number of bolts 23. Around the pin 25 is passed a metallic strap 26 through the curved recess 24 which helps to guide it, said portion of the strap that passes around pin 25 rising upward as strap 27 alongside of strap 26, and being bent at its end with a lip 28, this double thick strap and its lip being secured by spikes or nails 29 to the beam, block, or other part 14, in like manner and with the same purpose and effect as clamp 6 is secured. The insertible pivoted strap member is an easy substitute for the permanently pivoted clamping plate 6, and may often be made use of with good results; for such strap when released from the parts to which it is spiked is itself released from its pivot pin and may be disposed of with the rest of the temporary dunnage, as it were.

It will be noted that by the use of my permanent clamps that engage temporary and transient holding members I not only preserve the car structure from injury and demolition through rough handling, but I also provide a much more effective anchoring of the frames and blocks to the car floor. When chocks, as 3, and straps, as 18, and frames with legs, as 16, have their lower ends spiked or nailed to the floor, a strong upward pull on these parts, or an excessive and extreme vibration of the car, may pull the nails from the floor, and cause the destruction or great damage to the dislodged automobiles. When however clamps or straps which stand alongside of the chocks and rails vertically or substantially so and are spiked thereto by spikes that enter the wooden members horizontally and parallel to the floor as well as by top spikes which are at right angles to the aforesaid spikes, the spikes are in sheer and cannot be pulled out or loosened by any strain thereon, since such strains as exist are not in the right direction to affect them, and hence the result with these clamps is far more satisfactory.

What I claim is:

1. The combination with a car floor, of a plurality of plates set therein flush with the surface of the floor, and a movable member hingedly connected to each of said plates and adapted to be lifted from a flush position to an upright position, and temporary merchandise supports, to which the aforesaid upright members are attached to securely hold the supports and merchandise from displacement during transit.

2. The hereindescribed means for shipping automobiles in a car without injury to the shipping car, which consists in the combination with the car floor, of a plurality of plates set therein flush with the surface of the floor, and a movable member hingedly connected to each of said plates and adapted to be lifted from a concealed flush position in the floor to an upright position, and temporary supports and braces for the automobiles to which the aforesaid movable members when upright are attached to hold the supports and the automobiles from lateral and endwise jarring out of place.

3. The hereindescribed means for shipping automobiles without injury to the car containing them, which consists in the combination with the car floor, of a plurality of plates set therein flush with the surface of the floor, each provided with means for hinging a movable member thereto, a movable member connected to said hinging means of each plate and adapted to occupy an upright position, temporary chocks, supporting bars and braces for the automobiles to which the aforesaid upright movable members are secured, and means for securing said movable members to said temporary members.

4. The hereindescribed means for shipping automobiles without injury to the car in which they are shipped, which consists in the combination with the car floor, of a plurality of plates set in the floor at a plurality of points flush with the top surface of the floor, a member pivoted to each of said plates and having a flanged upper end, said pivoted members being adapted to be lifted from a flush position in the floor to an upright position, chocks, beams, and braces for the automobiles engaged by the lifted members, and to which said members are attached to hold the said parts and the supported automobiles from lateral or endwise displacement.

5. The hereindescribed means for supporting automobiles in cars without injury to floors of said cars, which consists in the combination with the car floors, of plates set fast therein and flush with the surface of the floor, said plates being in pairs whose members are opposite to each other and adjacent to the opposite edges of the floor, movable members hingedly connected to each of said plates and adapted to be lifted from a flush position in the floor to an upright position, chocks for automobile wheels to which opposite upright hinged members are fastened while the chocks are in use, and bars forming portions of automobile carrying frames, to which bars opposite upright hinged members are fastened while the bars are in use, to prevent lateral and endwise jar and dislocation of the automobiles while in transit.

6. In a car, a floor, in combination with plates set therein flush with the surface of the floor, members pivoted to the plates and movable to lie flush with the floor when not in use and to project at an angle above the floor when in use, said pivoted members being perforated to receive attaching means, said plates being arranged in pairs, wheel chocks to which pairs of said pivoted members are fastened while the chocks are in use, pairs of bars forming portions of automobile holding frames, to which bars pairs of pivoted members are secured while the frames are in use.

7. The method of securely holding wheeled vehicles in railway cars in transit to prevent lateral and longitudinal displacement, the use of such means being without injury to the car floor, which consists in permanently applying clamps to the floor in such a manner that they will be flush with the floor surface when not in use but will project above the floor when in use, providing temporarily-used chocks and frames for the wheeled vehicles and their wheels, fastening the projecting clamps to the chocks and frames during transit, and disconnecting clamps from the chocks and frames to release the wheeled vehicles after transit.

8. The method of securely holding wheeled vehicles in railway cars for shipment to prevent longitudinal and lateral movement, the use of such means being without injury to the car floor, which consists in permanently attaching a plurality of clamps to the floor in such a manner that they will lie flush with the floor when they are not in use but may be caused to project above the floor when in use, providing chocks for some of the wheels, providing frames for vehicle half decking, which frames include horizontal bars, securing the projected clamps to the chocks and bars temporarily during transit, and disconnecting the clamps from said members after transit.

In testimony whereof I hereunto affix my signature.

JOHN McMULLEN.